Feb. 3, 1942.   F. ZACCHEO ET AL   2,272,104
ELECTRIC RECTIFIER
Filed June 29, 1940

Inventors,
Ferdinando Zaccheo &
Victor Willson
By: Glascock Downing Seebold
Attorneys Patented Feb. 3, 1942

2,272,104

UNITED STATES PATENT OFFICE 2,272,104

ELECTRIC RECTIFIER

Ferdinando Zaccheo and Victor Willson, Rome, Italy

Application June 29, 1940, Serial No. 343,304 In Great Britain October 13, 1939

3 Claims. (Cl. 175—366)

The present invention relates to rectifiers and more specifically pertains to a combination of materials for rectifying alternating current.

An object of this invention is to provide a static dry rectifier for converting alternating electric current into direct current, the main feature of which is the use of materials other than copper oxide, the latter being generally made use of in like devices.

Other and further objects and features of the invention will be apparent from a consideration of the annexed drawing and the following description wherein several exemplary embodiments of the invention are disclosed.

In the same manner as in the known types, the rectifier according to this invention is made up with a number of elements connected together both mechanically and electrically. Each element consists of an electrode 1, preferably formed of a nickel plate of any suitable shape, coated on one side with a layer of selenium oxide 2; on this layer a second layer is superimposed, made of zinc, which forms a counter-electrode 3.

Figure 1:
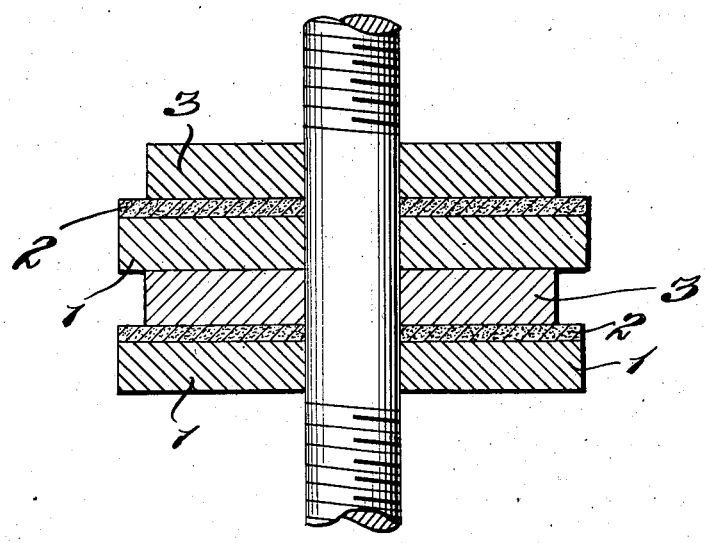
Fig. 1 is a sectional view of a rectifier embodying the invention.
Figure 2:
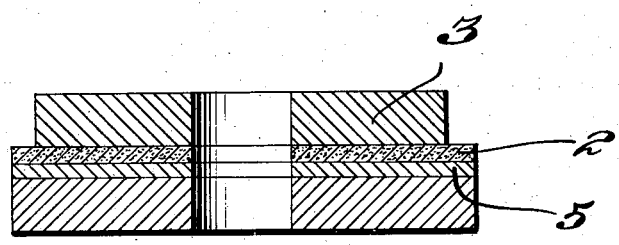
Fig. 2 is a similar view illustrating a modification.

In the electrode the nickel plate acts only as a support for the selenium oxide layer, the latter being the active material, or the part which really rectifies the current. Therefore the plate need not be made of nickel throughout its entire thickness, it being sufficient that this metal forms only the outside surface 5 as shown in Fig. 2 which directly contacts the selenium oxide 2, owing to the fact that nickel is unacted upon by said oxide and atmospheric agents. It is generally advisable to make said electrode with an inexpensive metal, such as nickel plated iron. Also several alloys and other materials are suitable for this purpose, provided that they have sufficient conductivity and strength.

Moreover, it is not necessarily required that the active layer 2 should be made exclusively of selenium oxide but oxides of metals belonging to the selenium group according to Mendeleeff's periodic system of elements, may be added to said oxide. The metals belonging to this group include tellurium, neodimium and selenium. Other compounds of such metals may be further substituted for or added to these oxides, such as binary, ternary, quaternary compounds, or even compounds including more than four components.

In a like manner zinc, cadmium and mercury belonging to the zinc group of metals, or even alloys of metals of this group, may be substituted for pure zinc in the counter-electrode 3.

The rectifier according to this invention, as compared with the known rectifiers, chiefly affords the advantage that it may be subjected to a higher voltage for each element, this voltage being allowed to reach and even exceed the virtual value of 11 volts on the alternating current side, while copper oxide rectifiers may only be subjected to a voltage not exceeding 5 virtual volts for each element. With the usual bridge connection a virtual voltage of 22 volts may be applied to each bridge, and a direct voltage of 17 volts may be obtained on the direct current side. It will be noted, however, that, with an alternating current voltage of 22 volts, the direct current output voltage may exceed 17 volts and may be raised up to 19.5 volts by properly choosing the materials for the active layer.

While the invention has been described with reference to specific structural details it is apparent that changes may be made therein. Such modifications may be made without departing from the spirit and scope of the invention as set forth in the appended claims.

We claim:

1. A static dry rectifier for converting alternating electric current into direct current comprising an electrode consisting of a plate made of nickel; an active or rectifying layer coating one side of the electrode which layer consists of selenium oxide; a counter-electrode consisting of a layer of zinc superposed on said rectifying layer.

2. A static dry rectifier for converting alternating electric current into direct current comprising an electrode consisting of a plate made of any suitable material plated with nickel; an active or rectifying layer coating one side of the electrode which layer consists of selenium oxide associated with oxides of other elements belonging to the same group as selenium according to Mendeleeff's periodic system of elements; a counter-electrode consisting of a layer of metals belonging to the same group as zinc according to Mendeleeff's periodic system of elements superposed on said rectifying layer.

3. A static dry rectifier for converting alternating electric current into direct current, comprising an electrode consisting of any suitable material plated with nickel; an active or rectifying layer coating one side of the electrode which layer consists of selenium oxide associated with any suitable compounds of elements belonging to the same group as selenium according to Mandeleeff's periodic system of elements; a counter-electrode consisting of a layer of alloys of metals belonging to the same group as zinc according to Mendeleeff's periodic system of elements superposed on said rectifying layer.

FERDINANDO ZACCHEO.
VICTOR WILLSON.